(12) United States Patent
Zhu

(10) Patent No.: US 11,937,180 B2
(45) Date of Patent: Mar. 19, 2024

(54) CARRIER ACTIVATION METHOD, DEVICE, APPARATUS, SYSTEM, AND STORAGE MEDIUM

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 462 days.

(21) Appl. No.: 17/270,692

(22) PCT Filed: Aug. 31, 2018

(86) PCT No.: PCT/CN2018/103663
§ 371 (c)(1),
(2) Date: Feb. 23, 2021

(87) PCT Pub. No.: WO2020/042178
PCT Pub. Date: Mar. 5, 2020

(65) Prior Publication Data
US 2021/0345241 A1    Nov. 4, 2021

(51) Int. Cl.
*G08C 17/00*   (2006.01)
*H04L 5/00*    (2006.01)
(Continued)

(52) U.S. Cl.
CPC ....... *H04W 52/0212* (2013.01); *H04L 5/0007* (2013.01); *H04L 5/0053* (2013.01); *H04W 52/0229* (2013.01); *H04W 72/044* (2013.01)

(58) Field of Classification Search
CPC ......... H04W 52/0212; H04W 52/0229; H04W 72/044; H04L 5/0007; H04L 5/0003
See application file for complete search history.

(56) References Cited

U.S. PATENT DOCUMENTS

| 8,451,798 B2 | 5/2013 | Chen |
| 8,489,152 B2 | 7/2013 | Chen et al. |

(Continued)

FOREIGN PATENT DOCUMENTS

| CN | 101828340 A | 9/2010 |
| CN | 101932104 A | 12/2010 |

(Continued)

OTHER PUBLICATIONS

International Search Report and Written Opinion dated Apr. 26, 2019 in PCT/CN2018/103663, 6 pages.

(Continued)

*Primary Examiner* — Erika A Washington
(74) *Attorney, Agent, or Firm* — Oblon, McClelland, Maier & Neustadt, L.L.P.

(57) ABSTRACT

Provided are a carrier activation method, apparatus, device and system and a storage medium, and belongs to the technical field of communications. The method includes: wake-up information is received on a predetermined carrier that is a carrier, configured to transmit the wake-up information, in at least two carriers allocated to User Equipment (UE); and the predetermined carrier and at least one other carrier are activated based on the wake-up information, or, at least two other carriers are activated based on the wake-up information, the other carrier(s) being a carrier(s) other than the predetermined carrier in the at least two carriers. According to the present disclosure, the problem that the UE needs to detect the wake-up information on each carrier and determine whether to activate the carrier based on the wake-up information is solved, and the energy consumption of the UE is reduced and the endurance of the UE is improved.

16 Claims, 7 Drawing Sheets

(51) Int. Cl.
*H04W 52/02* (2009.01)
*H04W 72/044* (2023.01)

(56) References Cited

U.S. PATENT DOCUMENTS

| | | |
|---|---|---|
| 8,515,481 B2 | 8/2013 | Chen et al. |
| 9,357,500 B2 | 5/2016 | Chen et al. |
| 2010/0061284 A1 | 3/2010 | Chen et al. |
| 2010/0118720 A1 | 5/2010 | Gauvreau et al. |
| 2010/0322175 A1 | 12/2010 | Chen |
| 2011/0013548 A1 | 1/2011 | Chen et al. |
| 2011/0116467 A1 | 5/2011 | Jung et al. |
| 2013/0039202 A1 | 2/2013 | Feuersanger et al. |
| 2013/0272183 A1 | 10/2013 | Chen et al. |
| 2013/0294312 A1 | 11/2013 | Chen et al. |
| 2014/0016506 A1 | 1/2014 | Gauvreau et al. |
| 2014/0064170 A1 | 3/2014 | Seo |
| 2015/0055533 A1 | 2/2015 | Jung et al. |
| 2015/0124755 A1 | 5/2015 | Gauvreau et al. |
| 2015/0181604 A1 | 6/2015 | Feuersanger et al. |
| 2015/0271750 A1 | 9/2015 | Jung et al. |
| 2016/0241376 A1 | 8/2016 | Gauvreau et al. |
| 2016/0242114 A1 | 8/2016 | Jung et al. |
| 2017/0012760 A1 | 1/2017 | Feuersaenger et al. |
| 2017/0078075 A1 | 3/2017 | Gauvreau et al. |
| 2018/0198592 A1 | 7/2018 | Gauvreau et al. |
| 2019/0182017 A1 | 6/2019 | Feuersaenger et al. |
| 2020/0322117 A1 | 10/2020 | Feuersaenger et al. |
| 2021/0160039 A1 | 5/2021 | Gauvreau et al. |

FOREIGN PATENT DOCUMENTS

| | | |
|---|---|---|
| CN | 102932124 A | 2/2013 |
| CN | 104684050 A | 6/2015 |
| CN | 110557764 A | 12/2019 |
| CN | 109196935 B | 8/2021 |
| EP | 2 309 662 A2 | 4/2011 |
| EP | 2 360 864 A1 | 8/2011 |
| WO | WO 2010/025681 A1 | 3/2010 |
| WO | WO 2010/051209 A1 | 5/2010 |
| WO | WO 2014/179921 A1 | 11/2014 |
| WO | WO 2016/073087 A1 | 5/2016 |
| WO | WO 2018/145768 A1 | 8/2018 |

OTHER PUBLICATIONS

Combined Chinese Office Action and Search Report dated Feb. 26, 2021 in corresponding Chinese Patent Application No. 201880001236.3 (with English Translation), 14 pages.

Huawei, HiSilicon, "Remaining Issues in Wake-up Signal" 3GPP TSG-RAN WG2 Meeting #102 R2-1807850 Busan, Korea, May 21-25, 2018, Revision of R2-1805082, 3 pages.

European Office Action dated Nov. 18, 2022 in European Patent Application No. 18931420.6, 6 pages.

Extended European Search Report dated Mar. 11, 2022 in European Patent Application No. 18931420.6, 12 pages.

Office Action dated May 27, 2021 in corresponding Chinse Patent Application No. 201880001236.3 (with English Translation), 5 pages.

CARRIER ACTIVATION METHOD, DEVICE, APPARATUS, SYSTEM, AND STORAGE MEDIUM

CROSS-REFERENCE TO RELATED APPLICATION

This application is a US national stage of International Patent Application No. PCT/CN2018/103663 filed on Aug. 31, 2018, the content of which is hereby incorporated in its entirety.

TECHNICAL FIELD

The present disclosure relates to the technical field of communications, including to a carrier activation method, apparatus, device and system, and a storage medium.

BACKGROUND

The endurance of User Equipment (UE) is an important factor of affecting the performance of the UE. In Long Term Evolution (LTE) systems, when UE does not need to transmit data, the UE may enter a dormant state, and the UE may be controlled to periodically detect whether to activate a carrier for data transmission, thereby improving the endurance of the UE. In a situation that a base station configures at least two carriers for UE, the UE needs to detect wake-up information on each carrier, and determine, based on the wake-up information, whether to activate the carrier.

SUMMARY

Aspects of the present disclosure provides a carrier activation method, apparatus, device and system and a storage medium.

According to a first aspect of disclosure, a carrier activation method is provided, which may include receiving wake-up information on a predetermined carrier, the predetermined carrier being a carrier, configured to transmit the wake-up information, in at least two carriers allocated to User Equipment (UE), and activating the predetermined carrier and at least one other carrier based on the wake-up information, or, activating at least two other carriers based on the wake-up information, the other carrier(s) being a carrier(s) other than the predetermined carrier in the at least two carriers.

According to a second aspect of the embodiments of the present disclosure, a carrier activation method is provided. The method can include generating wake-up information, and sending the wake-up information to User Equipment (UE) on a predetermined carrier, the predetermined carrier being a carrier, configured to transmit the wake-up information, in at least two carriers allocated to the UE, the wake-up information indicating that the UE activates the predetermined carrier and at least one other carrier, or, the wake-up information indicating that the UE activates at least two other carriers, and the other carrier(s) being a carrier(s) other than the predetermined carrier in the at least two carriers.

According to a third aspect of the disclosure, a carrier activation apparatus is provided. The apparatus can include a receiving module that is configured to receive wake-up information on a predetermined carrier, the predetermined carrier being a carrier, configured to transmit the wake-up information, in at least two carriers allocated to UE. The apparatus can also include an activation module that is configured to activate the predetermined carrier and at least one other carrier based on the wake-up information received by the receiving module, or, activate at least two other carriers based on the wake-up information, the other carrier(s) being a carrier(s) other than the predetermined carrier in the at least two carriers.

According to a fourth aspect of disclosure, a carrier activation apparatus is provided. The apparatus can include a generation module that is configured to generate wake-up information. The apparatus can further include a sending module that is configured to send the wake-up information generated by the generation module to UE on a predetermined carrier, the predetermined carrier being a carrier, configured to transmit the wake-up information, in at least two carriers allocated to the UE, the wake-up information indicating that the UE activates the predetermined carrier and at least one other carrier, or, the wake-up information indicating that the UE activates at least two other carriers, and the other carrier(s) being a carrier(s) other than the predetermined carrier in the at least two carriers.

According to a fifth aspect of the embodiments of the present disclosure, UE is provided having a processor and a memory that is configured to store an instruction executable for the processor. The processor can be configured to acquire data transmission configuration information, receive wake-up information on a predetermined carrier, the predetermined carrier being a carrier, configured to transmit the wake-up information, in at least two carriers allocated to the UE, and activate the predetermined carrier and at least one other carrier based on the wake-up information, or, activate at least two other carriers based on the wake-up information, the other carrier(s) being a carrier(s) other than the predetermined carrier in the at least two carriers.

According to a sixth aspect of the disclosure, a base station is provided having a processor and a memory that is configured to store an instruction executable for the processor. The processor can be configured to generate wake-up information and send the wake-up information to UE on a predetermined carrier, the predetermined carrier being a carrier, configured to transmit the wake-up information, in at least two carriers allocated to the UE, the wake-up information indicating that the UE activates the predetermined carrier and at least one other carrier, or, the wake-up information indicating that the UE activates at least two other carriers, and the other carrier(s) being a carrier(s) other than the predetermined carrier in the at least two carriers.

According to a seventh aspect of the disclosure, a data transmission system is provided, which may include any carrier activation apparatus as described in the third aspect and any carrier activation apparatus as described in the fourth aspect, or, may include any carrier activation apparatus as described in the fifth aspect and any carrier activation apparatus as described in the sixth aspect.

According to an eighth aspect of the disclosure, a non-transitory computer-readable storage medium is provided, in which at least one instruction, at least one segment of program, a code set or an instruction set is stored. The at least one instruction, the at least one segment of program, the code set or the instruction set may be loaded and executed by a processor to implement the carrier activation method as described in the first aspect, or, the at least one instruction, the at least one segment of program, the code set or the instruction set may be loaded and executed by the processor to implement the carrier activation method as described in the second aspect.

The technical solutions provided by the embodiments of the present disclosure may have the beneficial effects. For example, wake-up information may be received on a predetermined carrier, and the predetermined carrier and at least one other carrier may be activated based on the wake-up information, or, at least two other carriers may be activated based on the wake-up information. As the UE may be indicated through one piece of wake-up information to activate at least two carriers, the problem that the UE needs to detect the wake-up information on each carrier and determine whether to activate the carrier based on the wake-up information is solved, and the energy consumption of the UE is reduced and the endurance of the UE is improved.

It is to be understood that the above general descriptions and detailed descriptions below are only exemplary and not intended to limit the present disclosure.

BRIEF DESCRIPTION OF THE DRAWINGS

The accompanying drawings, which are incorporated in and constitute a part of this specification, illustrate exemplary embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The constant emergence of novel Internet applications such as Augmented Reality (AR)/Virtual Reality (VR) and vehicle-to-vehicle communication makes higher requirements on wireless communication technologies and urges the wireless communication technologies to be constantly evolved to meet the requirements of the applications. At present, a cellular mobile communication technology is in an evolution stage of a new-generation technology. An important characteristic of the new-generation technology mentioned here is that flexible configuration of multiple service types is supported. Different service types have different requirements on a wireless communication technology. For example, a main requirement of an enhanced Mobile Broad Band (eMBB) service type focuses on the aspects of great bandwidth, high rate and the like, a main requirement of an Ultra Reliable Low Latency Communication (URLLC) service type focuses on the aspects of relatively high reliability and low delay, and a main requirement of a massive Machine Type Communication (mMTC) service type focuses on the aspect of large connection number. Therefore, a new-generation wireless communication system requires a flexible and configurable design to support transmission of multiple service types.

Figure 1:
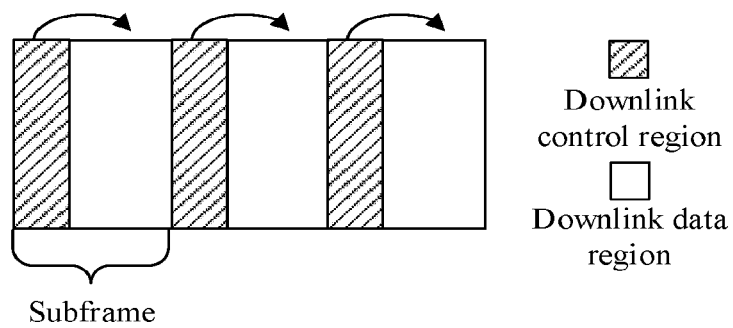
FIG. 1 is a schematic diagram illustrating a resource scheduling method in an LTE system.

For dynamic scheduling in an LTE system, a scheduling instruction may indicate only one time-frequency resource, and the time-frequency resource is configured to indicate a frequency-domain resource in a time-domain unit. The time-domain unit mentioned here is a time unit and may be a common time-domain unit in a communication system such as a symbol, a subframe, a slot and a radio frame. Referring to FIG. 1, a schematic diagram illustrating a resource scheduling method in an LTE system is shown. In FIG. 1, descriptions are made with a condition that the time-domain unit is a subframe and a shaded area and a white filled area form a subframe as an example. The shaded area is a downlink control region configured to transmit control signaling including scheduling signaling to indicate that UE performs data transmission on a time-frequency resource indicated by the arrowhead thereof. The white filled area is a downlink data region, i.e., the time-frequency resource indicated by the arrowhead of the scheduling signaling, for data transmission of the UE.

The endurance of UE is an important factor of affecting the performance of the UE. There is a need for the UE to continuously detect whether signaling is received. The base station does not send signaling to the UE when the UE unnecessarily performs service interaction, but the UE still needs to detect whether the signaling is received, which results in large energy consumption of the UE. Hence, a dormant state is defined in an LTE system. UE enters a dormant state when unnecessarily performing service interaction so as to prevent detection on signaling and reduce the energy consumption of the UE.

Figure 2:
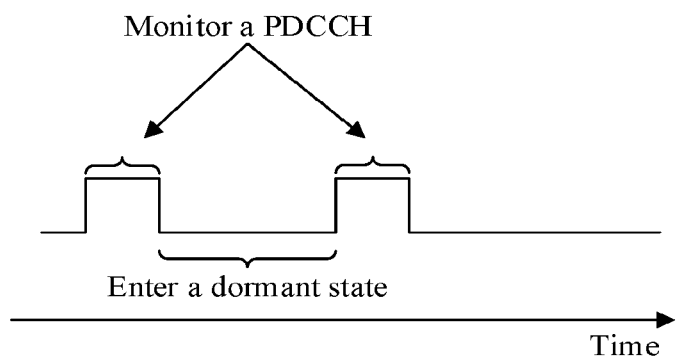
FIG. 2 is a schematic diagram illustrating that UE monitors a Physical Downlink Control Channel (PDCCH) in an LTE system.
Figure 3:
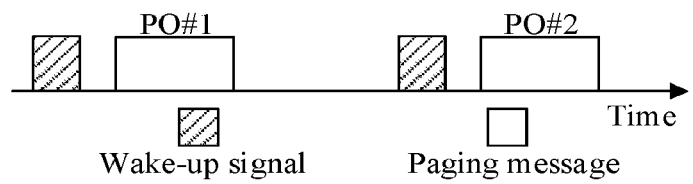
FIG. 3 is a schematic diagram illustrating that UE monitors a wake-up signal in an LTE system.

When UE is in a dormant state, the UE may periodically monitor a PDCCH based on configurations of a base station. Optionally, the UE may monitor the PDCCH at a Paging Occasion (PO), enter an activated state for data transmission in response to receiving an indication that downlink control signaling has a paging message of the UE, and continuously enter a dormant state and periodically monitor the PDCCH again in response to receiving an indication that the downlink control signaling does not have a paging message of the UE, thereby saving the energy consumption of the UE, which refers to FIG. 2. And/or, the base station may send a wake-up signal before sending a paging message, the wake-up signal carrying an indication indicating whether there is a paging message of the UE. The UE may periodically monitor whether the wake-up signal is received, enter the activated state for data transmission in response to receiving an indication that the wake-up signal has the paging message of the UE, and continuously enters the dormant state and periodically monitor the wake-signal again in response to receiving an indication that the wake-up signal does not have the paging message of the UE, thereby saving the energy consumption of the UE, which refers to FIG. 3.

The energy consumption of UE may be saved by monitoring a PDCCH and/or a wake-up signal. However, in a case where a base station configures multiple carriers for the UE, the UE needs to detect wake-up information on each carrier, which also results in large energy consumption of the UE. The wake-up information includes downlink control signaling and/or a wake-up signal.

The carrier mentioned here is a radio resource for bearing data transmission. The radio resource may be a carrier, or may be a bandwidth portion on the carrier, or may be a combination of the carrier and the bandwidth portion, or another defined radio resource block. There are no limits made thereto in the embodiment.

In the embodiment, UE may be indicated through one piece of wake-up information for carrier activation. The carrier activation refers to that UE activates a data transmission and/or signaling detection on an indicated carrier. The indicated carrier is configured by a base station for the UE in advance, and may be in an activated or unactivated state. That is, the UE may be indicated through one piece of wake-up information to activate data transmission and/or signaling detection on at least two carriers, such that the problem that the UE needs to detect the wake-up information on each carrier is solved, and the energy consumption of the UE is reduced and the endurance of the UE is improved.

The implementation environment involved in a carrier activation method provided in the embodiments of the present disclosure will be briefly described below.

Figure 4:
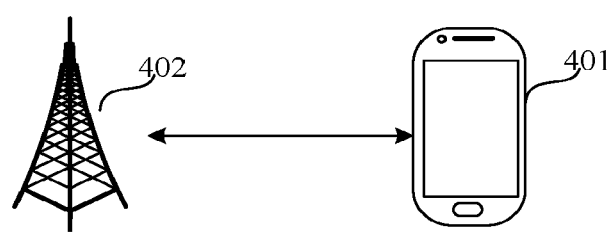
FIG. 4 is a schematic diagram illustrating an implementation environment involved in each embodiment of the present disclosure.

FIG. 4 is a schematic diagram illustrating an implementation environment involved in a carrier activation method provided by an embodiment of the present disclosure. As shown in FIG. 1, the implementation environment may include UE 401 and at least one base station 402 (only one base station 402 is shown in FIG. 4). The base station 402 may send wake-up information to the UE 401 on a predetermined carrier, and the UE 401 activates a carrier based on the wake-up information.

Figure 5:
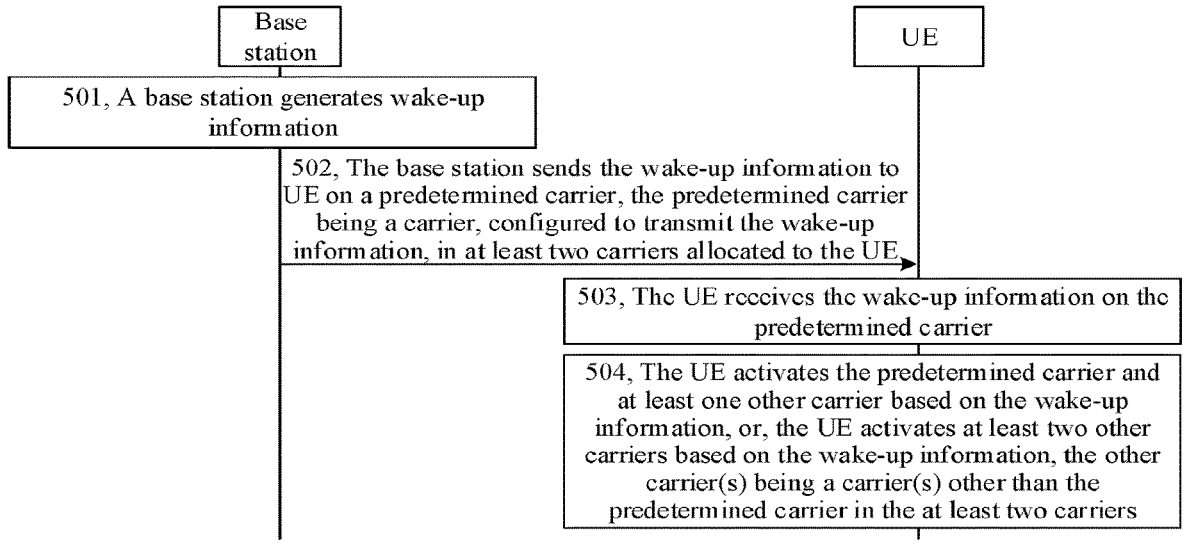
FIG. 5 is a flowchart showing a carrier activation method according to an exemplary embodiment.

FIG. 5 is a flowchart showing a carrier activation method according to an exemplary embodiment. The carrier activation method is applied to the implementation environment shown in FIG. 4. As shown in FIG. 5, the carrier activation method may include the following operations.

In Operation 501, a base station generates wake-up information.

In Operation 502, the base station sends the wake-up information to UE on a predetermined carrier, the predetermined carrier being a carrier, configured to transmit the wake-up information, in at least two carriers allocated to the UE.

In Operation 503, the UE receives the wake-up information on the predetermined carrier.

In Operation 504, the UE activates the predetermined carrier and at least one other carrier based on the wake-up information, or, the UE activates at least two other carriers based on the wake-up information, the other carrier(s) being a carrier(s) other than the predetermined carrier in the at least two carriers.

Operations 501-502 may be independently implemented as the embodiment on the base station side, and operations 503-504 may be independently implemented as the embodiment on the UE side.

To sum up, according to the carrier activation method provided by the present disclosure, wake-up information may be received on a predetermined carrier; and the predetermined carrier and at least one other carrier may be activated based on the wake-up information, or, at least two other carriers may be activated based on the wake-up information. As the UE may be indicated through one piece of wake-up information to activate at least two carriers, the problem that the UE needs to detect the wake-up information on each carrier and determine whether to activate the carrier based on the wake-up information is solved, and the energy consumption of the UE is reduced and the endurance of the UE is improved.

In the present disclosure, there are four implementations for carrier activation of UE. The four implementations will be described below through four embodiments in detail respectively.

Figure 6:
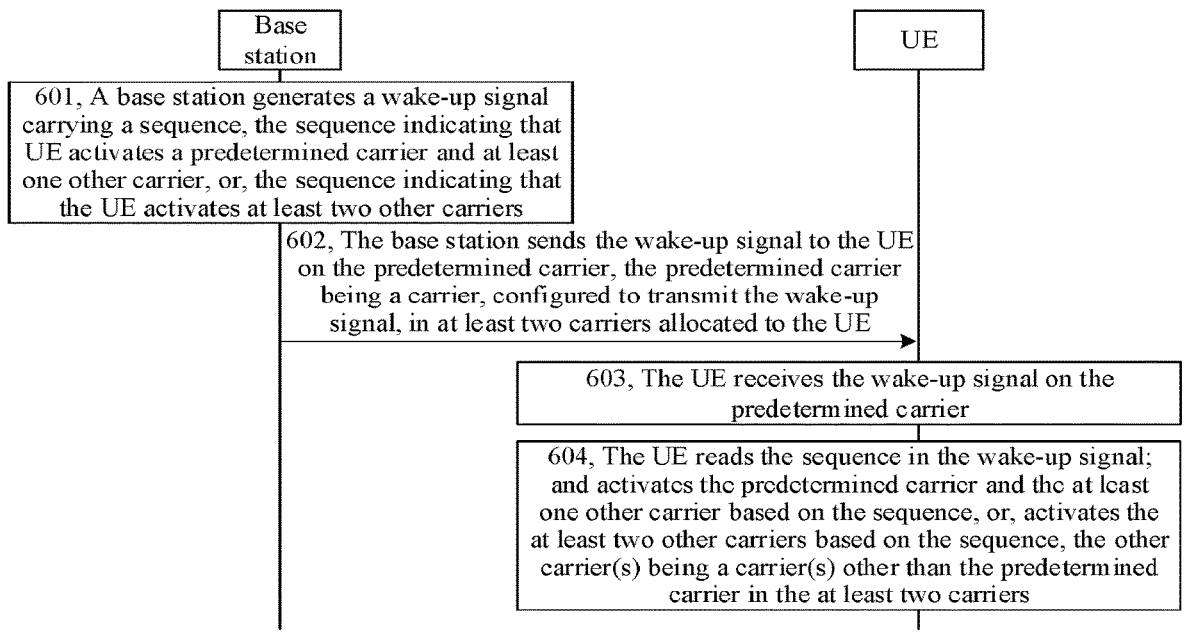
FIG. 6 is a flowchart showing a carrier activation method according to another exemplary embodiment.

FIG. 6 is a flowchart showing a carrier activation method according to another exemplary embodiment. The carrier activation method is applied to the implementation environment shown in FIG. 4. As shown in FIG. 6, the carrier activation method may include the following operations.

In Operation 601, a base station generates a wake-up signal carrying a sequence, the sequence indicating that UE activates a predetermined carrier and at least one other carrier, or, the sequence indicating that the UE activates at least two other carriers. Before implementation of this operation, the base station may first configure at least two carriers for the UE, and then specify a carrier from the at least two carriers to transmit the wake-up signal. The carrier specified by the base station is called the predetermined carrier. The other carrier(s) is (are) relative to the predetermined carrier, i.e., the other carrier(s) may be a carrier(s) other than the predetermined carrier in the at least two carriers allocated to the UE. Supposing that carriers allocated by the base station to the UE include carriers 1, 2, 3 and 4, and the predetermined carrier is 1, the other carrier(s) may be one or two or three of the carriers 2, 3 and 4.

During implementation of this operation, the base station may determine a to-be-activated carrier from the at least two carriers allocated to the UE, and then generate, based on the to-be-activated carrier, the wake-up signal carrying the sequence. In an implementation, the wake-up signal may indicate that the UE activates the predetermined carrier, and may further indicate that the UE activates at least one other carrier; and in another implementation, the wake-up signal may indicate that the UE activates at least two other carriers.

There are three sequences provided in the embodiment. The three sequences will be described below respectively.

1) In a first implementation, the sequence includes at least two indication bits, each indication bit is configured to indicate a carrier, a carrier indicated by each indication bit having a predetermined value is a to-be-activated carrier, and the to-be-activated carrier includes the predetermined carrier and the at least one other carrier, or, the to-be-activated carrier includes the at least two other carriers.

The number of indication bits in the sequence may be equal to the number of carriers allocated by the base station to the UE. For example, in a case where the base station allocates four carriers to the UE, the sequence includes four indication bits. Or, the number of indication bits in the sequence may be equal to the number of carriers allocated by the base station to other UE, and this number is more than the number of carriers allocated by the base station to the UE. For example, in a case where the base station allocates four carriers to the UE and allocates eight carriers to other UE, the sequence includes eight indication bits, with four indication bits reserved.

The base station may acquire a first corresponding relationship between indication bits and carrier identifiers in advance, search the first corresponding relationship for an indication bit corresponding to each carrier identifier upon determination of a to-be-activated carrier, and set a value of the indication bit as a predetermined value; and set a value of each of rest indication bits as a value other than the predetermined value.

For example, the sequence includes four indication bits. It may be determined according to the first corresponding relationship that the four indication bits sequentially indicate carriers 1-4 from front to back. It is supposed that the to-be-activated carrier is carriers 1 and 2, the predetermined value is 1 and the value other than the predetermined value is 0, the sequence generated by the base station may be 1100.

The first point to be noted is that the first corresponding relationship may be sent by the base station to the UE, or may also be specified in a communication protocol. There are no limits made thereto in the embodiment.

The second point to be noted is that the predetermined value and the value other than the predetermined value may be notified by the base station to the UE, or may be specified in a communication protocol. There are no limits made thereto in the embodiment.

The third point to be noted is that sequences in wake-up signals of different UEs may be the same or may be different. There are no limits made thereto in the embodiment.

2) In a second implementation, the sequence is configured to indicate a first carrier set, each carrier in the first carrier set is a to-be-activated carrier, and the to-be-activated carrier includes the predetermined carrier and the at least one other carrier, or, the to-be-activated carrier includes the at least two other carriers.

The base station may acquire a second corresponding relationship between sequences and first carrier sets in advance, determine, upon determination of a to-be-activated carrier, a first carrier set corresponding to the to-be-activated carrier, and then search the second corresponding relationship for a sequence corresponding to the first carrier set. The first carrier set corresponding to the to-be-activated carrier refers to that the carrier in the first carrier set is completely the same as the to-be-activated carrier. For example, in a case where the to-be-activated carriers are carriers 1 and 2, the first carrier set only includes the carriers 1 and 2; and in a case where the to-be-activated carriers are carriers 2 and 3, the first carrier set only includes the carriers 2 and 3.

During implementation, the case where the first carrier set includes multiple carriers refers to that the first carrier set includes carrier identifiers of the multiple carriers. As each carrier identifier is configured to identify one carrier, the first carrier set includes multiple carriers. For example, the first carrier set indicated by the sequence 1 in the second corresponding relationship includes carriers 1-4, and the first carrier set indicated by the sequence 2 includes carriers 5-8; if it is supposed that the to-be-activated carriers are the carriers 1-4, then a sequence generated by the base station may be the sequence 1.

It is to be noted that the second corresponding relationship may be sent by the base station to the UE, or may be specified in a communication protocol. There are no limits made thereto in the embodiment.

3) In a third implementation, each sequence is configured to indicate a to-be-activated carrier, and the to-be-activated carrier includes the predetermined carrier and the at least one other carrier, or, the to-be-activated carrier includes the at least two other carriers.

The wake-up signal includes at least two sequences, and each sequence is configured to indicate a to-be-activated carrier. Optionally, the sequences mentioned here meet an orthogonal relationship to ensure the accuracy of sequence detection. The base station may acquire a third corresponding relationship between sequences and carrier identifiers, and search the third corresponding relationship for a sequence corresponding to each carrier identifier upon determination of a to-be-activated carrier. For example, in the third corresponding relationship, sequence 1 indicates carrier 1, sequence 2 indicates carrier 2, sequence 3 indicates carrier 3 and sequence 4 indicates carrier 4; and supposing that to-be-activated carriers are the carriers 2 and 3, sequences generated by the base station may include the sequences 2 and 3.

It is to be noted that the third corresponding relationship may be sent by the base station to the UE, or may also be specified in a communication protocol. There are no limits made thereto in the embodiment.

In Operation 602, the base station sends the wake-up signal to the UE on the predetermined carrier, the predetermined carrier being a carrier, configured to transmit the wake-up signal, in at least two carriers allocated to the UE. The base station may determine the predetermined carrier that is pre-configured, and send the wake-up signal to the UE on the predetermined carrier.

In Operation 603, the UE receives the wake-up signal on the predetermined carrier.

In Operation 604, The UE reads a sequence in the wake-up signal; and activates the predetermined carrier and the at least one other carrier based on the sequence, or, activates the at least two other carriers based on the sequence, the other carrier(s) being a carrier(s) other than the predetermined carrier in the at least two carriers.

Corresponding to the above three sequences, a carrier may be activated by UE in following three manners.

1) When the sequence is generated by the base station in the first implementation, the UE may determine each indication bit having a predetermined value, then search for a carrier identifier indicated by each indication bit in the first corresponding relationship, and then activate the carrier indicated by each carrier identifier.

2) When the sequence is generated by the base station in the second implementation, the UE may search for a first carrier set indicated by the sequence in the second corresponding relationship, and then activate each carrier in the first carrier set.

3) When the sequence is generated by the base station in the third implementation, the UE may search for a carrier identifier indicated by each sequence in the third corresponding relationship, and then activate a carrier indicated by each carrier identifier.

Operations 601-602 may be independently implemented as the embodiment on the base station side, and operations 603-604 may be independently implemented as the embodiment on the UE side.

To sum up, according to the carrier activation method provided by the present disclosure, wake-up information may be received on a predetermined carrier; and the predetermined carrier and at least one other carrier may be activated based on the wake-up information, or, at least two other carriers may be activated based on the wake-up information. As UE may be indicated through one piece of wake-up information to activate at least two carriers, the problem that the UE needs to detect the wake-up information on each carrier and determine whether to activate a carrier based on the wake-up information is solved, and the energy consumption of the UE is reduced and the endurance of the UE is improved.

Figure 7:
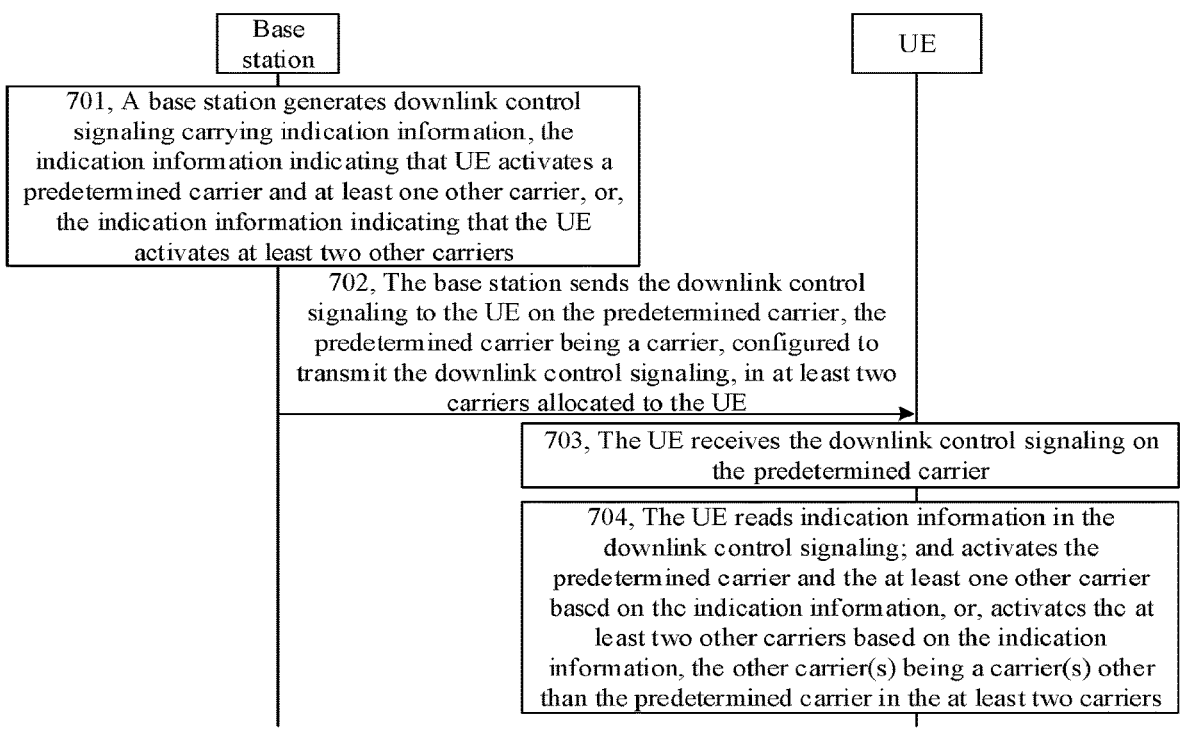
FIG. 7 is a flowchart showing a carrier activation method according to another exemplary embodiment.

FIG. 7 is a flowchart showing a carrier activation method according to another exemplary embodiment. The carrier activation method is applied to the implementation environment shown in FIG. 4. As shown in FIG. 7, the carrier activation method may include the following operations.

In Operation 701, a base station generates downlink control signaling carrying indication information, the indication information indicating that UE activates a predetermined carrier and at least one other carrier, or, the indication information indicating that the UE activates at least two other carriers.

For explanations on the carrier, predetermined carrier and other carrier, refer to the descriptions in operation 601. During implementation of this operation, the base station may determine a to-be-activated carrier from the at least two carriers allocated to the UE, and then generate, based on the to-be-activated carrier, the downlink control signaling carrying the indication information. In an implementation, the downlink control signaling may indicate that the UE activates the predetermined carrier, and may further indicate that the UE activates at least one other carrier; and in another implementation, the downlink control signaling may indicate that the UE activates at least two other carriers.

It is to be noted that the indication information mentioned here may be understood as the sequence in the embodiment shown in FIG. 6. For the generation process of the indication information, refer to the descriptions in operation 601.

The adding manner that the base station adds the indication information to the downlink control signaling will be described below.

In a first adding manner, in response to the indication information having a fixed position in the downlink control signaling, the indication information is added to the fixed position in the downlink control signaling. The case where the position of the indication information in the downlink control signaling is fixed may include two conditions. The first condition is that the number of bits of the indication information is fixed, and in this case, both the start position and the end position of the indication information in the downlink control signaling are fixed. The second condition is that the number of bits of the indication information is not fixed, and in such a case, the start position of the indication information in the downlink control signaling may be fixed but the end position may be not fixed, or the end position of the indication information in the downlink control signaling may be fixed but the start position may be not fixed. There are no limits made thereto in the embodiment.

In a case that the number of bits of the indication information is fixed and the position of the indication information in the downlink control signaling is fixed, position information may be specified in a communication protocol. Or, the position information may also be indicated before the base station sends the downlink control signaling to the UE, the UE stores the position information, and thereafter, the base station unnecessarily indicates the position information before sending the downlink control signaling to the UE each time. Or, the base station may also indicate the position information before sending the downlink control signaling to the UE each time. The position information may include the start position and the end position, or, may include the start position and the number of bits, or, may include the end position and the number of bits.

In a case that the number of bits of the indication information is not fixed and the position of the indication information in the downlink control signaling is fixed, the start position or the end position may be specified in a communication protocol, and the base station further needs to indicate the number of bits of the indication information before the downlink control signaling sent each time. Or, the base station may also indicate the start position or the end position before sending the downlink control signaling to the UE at the first time, and the base station further needs to indicate the number of bits of the indication information in the downlink control signaling sent each time. Or, the base station may indicate the start position and the end position of the indication information before the downlink control signaling sent each time.

With a case where the number of bits of the indication information is fixed and the position of the indication information in the downlink control signaling is fixed as an example, supposing that the start position of the indication information in the downlink control signaling is a 5th bit and the number of bits is 2, the base station may add the value of the indication information to the 5-6th bit in the downlink control signaling.

In a second adding manner, in response to the indication information having a flexible position in the downlink control signaling, position information may be generated, the position information indicating a position of the indication information at present time in the downlink control signaling; and the indication information may be added to the position indicated by the position information in the downlink control signaling.

The case where the position of the indication information in the downlink control signaling is not fixed may include two conditions. The first condition is that the number of bits of the indication information is fixed, and in such a case, the end position may be deduced based on the start position of the indication information in the downlink control signaling, or, the start position may be deduced based on the end position of the indication information in the downlink control signaling. The second condition is that the number of bits of the indication information is not fixed, and in such a case, both the start position and the end position of the indication information in the downlink control signaling are not fixed.

In a case that the number of bits of the indication information is fixed and the position of the indication information in the downlink control signaling is not fixed, the number of bits may be specified in a communication protocol, or the number of bits may also be indicated before the base station sends the downlink control signaling to the UE at the first time. After that, the base station needs to indicate the start position and/or the end position in the downlink control signaling sent each time.

In a case that the number of bits of the indication information is not fixed and the position of the indication information in the downlink control signaling is not fixed, the base station needs to indicate the start position and the end position before sending the downlink control signaling each time, or, the base station needs to indicate the start position and the number of bits before sending the downlink control signaling each time, or the base station needs to indicate the end position and the number of bits before sending the downlink control signaling each time.

With a case where the number of bits of the indication information is not fixed and the position of the indication information in the downlink control signaling is not fixed as an example, supposing that the indication information is 2 bits and the base station is to add the indication information to the 5-6th bit in the downlink control signaling, the base station may generate position information for indicating that the indication information is presently located at the 5-6th bit in the downlink control signaling, and then add the indication information to the 5-6th bit in the downlink control signaling.

In Operation 702, the base station sends the downlink control signaling to the UE on the predetermined carrier, the predetermined carrier being a carrier, configured to transmit the downlink control signaling, in at least two carriers allocated to the UE. The base station may determine the predetermined carrier that is pre-configured, and send the downlink control signaling to the UE on the predetermined carrier.

In Operation 703, the UE receives the downlink control signaling on the predetermined carrier.

In Operation 704, the UE reads indication information in the downlink control signaling; and activates the predetermined carrier and the at least one other carrier based on the indication information, or, activates the at least two other carriers based on the indication information, the other carrier (s) being a carrier(s) other than the predetermined carrier in the at least two carriers.

Corresponding to the two adding manners that the base station adds the indication information to the downlink control signaling, there are also two acquisition manners that the UE acquires the indication information from the downlink control signaling. The two acquisition manners will be described below respectively. In the embodiment, with the indication information being the downlink control signaling as an example, in a case of adding the indication information to other downlink control signaling, the acquisition manner is the same as the following two acquisition manners, and will not be elaborated herein.

In a first acquisition manner, in response to the indication information having a fixed position in the downlink control signaling, the indication information is read at the fixed position in the downlink control signaling.

In a case that the number of bits of the indication information is fixed and the position of the indication information in the downlink control signaling is fixed, the UE may acquire the position information of the indication information in the downlink control signaling from a communication protocol, or the UE may acquire the position information before the base station sends the downlink control signaling at the first time, the UE may store the position information, and thereafter, the base station unnecessarily indicates the position information before sending the downlink control signaling to the UE each time; or the UE may acquire the position information before the base station sends the downlink control signaling each time. The position information may include the start position and the end position, or, may include the start position and the number of bits, or, may include the end position and the number of bits. The UE then may determine the position of the indication information in the downlink control signaling based on the position information, and read the indication information at the position.

In a case that the number of bits of the indication information is not fixed and the position of the indication information in the downlink control signaling is fixed, the UE may acquire the start information of the indication information in the downlink control signaling from a communication protocol, or may acquire the start position of the indication information before the base station sends the downlink control signaling at the first time, and then acquire the number of bits of the indication information from the downlink control signaling received at present time, or the UE may acquire the end information of the indication information in the downlink control signaling from a communication protocol, or, acquire the end position of the indication information before the base station sends the downlink control signaling at the first time, and then acquire the number of bits of the indication information from the downlink control signaling received at present time; or, the UE may acquire the start position and the end position of the indication information before the base station sends the downlink control signaling each time. The UE then determines the position of the indication information in the downlink control signaling based on the above information, and reads the indication information at the position.

With a case where the number of bits of the indication information is fixed and the position of the indication information in the downlink control signaling is fixed as an example, supposing that the start position of the indication information in the downlink control signaling is a 5th bit and the number of bits is 2, the UE may read the indication information at the 5-6th bit in the downlink control signaling.

In a second acquisition manner, in response to the indication information having a flexible position in the downlink control signaling, position information may be acquired, the position information indicating a position of the indication information at present time in the downlink control signaling, and the indication information may be read at the position indicated by the position information in the downlink control signaling.

In a case that the number of bits of the indication information is fixed and the position of the indication information in the downlink control signaling is not fixed, the UE may acquire the number of bits of the indication information from a communication protocol, or the UE may acquire the number of bits of the indication information before the base station sends the downlink control signaling at the first time and then acquire the start position and/or the end position of the indication information from the downlink control signaling received at present time, determine a position of the indication information in the downlink control signaling based on the above information, and read the indication information at the position.

In a case that the number of bits of the indication information is not fixed and the position of the indication information in the downlink control signaling is not fixed, the UE may acquire the start position and the end position of the indication information before the base station sends the downlink control signaling each time, or the UE may acquire the start position and the number of bits of the indication information before the base station sends the downlink control signaling each time, or the UE may acquire the end position and the number of bits of the indication information before the base station sends the downlink control signaling each time. The UE then may determine the position of the indication information in the downlink control signaling based on the above information, and read the indication information at the position.

With a case where the number of bits of the indication information is not fixed and the position of the indication information in the downlink control signaling is not fixed as an example, supposing that the indication information is 2 bits and the position information indicates that the indication information is added to the 5-6th bit in the downlink control signaling, the UE may read the indication information at the 5-6th bit in the downlink control signaling based on the position information. After the indication information is obtained, when the indication information is understood as the sequence in the embodiment shown in FIG. 6, the process for activating the carrier based on the indication information refers to the descriptions in operation 604.

Operations 701-702 may be independently implemented as the embodiment on the base station side, and operations 703-704 may be independently implemented on the embodiment at the UE side.

To sum up, according to the carrier activation method provided by the present disclosure, wake-up information may be received on a predetermined carrier; and the predetermined carrier and at least one other carrier may be activated based on the wake-up information, or, at least two other carriers may be activated based on the wake-up information. As the UE may be indicated through one piece of wake-up information to activate at least two carriers, the problem that the UE needs to detect the wake-up information on each carrier and determine whether to activate the carrier based on the wake-up information is solved, and the energy consumption of the UE is reduced and the endurance of the UE is improved.

Figure 8:
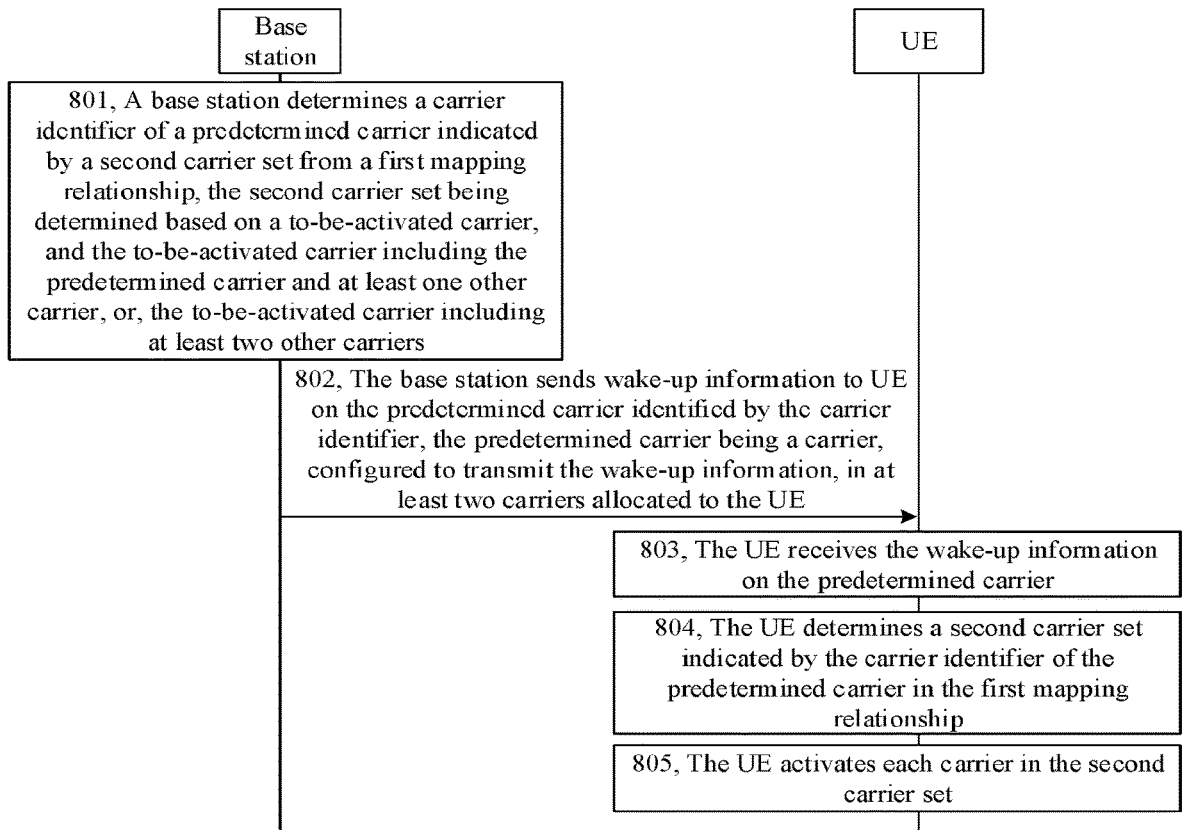
FIG. 8 is a flowchart showing a carrier activation method according to another exemplary embodiment.

FIG. 8 is a flowchart showing a carrier activation method according to another exemplary embodiment. The carrier activation method is applied to the implementation environment shown in FIG. 4. As shown in FIG. 8, the carrier activation method may include the following operations.

In Operation 801, a base station determines a carrier identifier of a predetermined carrier indicated by a second carrier set from a first mapping relationship, the second carrier set being determined based on a to-be-activated carrier, and the to-be-activated carrier including the predetermined carrier and at least one other carrier, or, the to-be-activated carrier including at least two other carriers.

For explanations on the carrier, predetermined carrier and other carrier, refer to the descriptions in operation 601. During implementation of this operation, a base station may determine a to-be-activated carrier from at least two carriers allocated to UE, determine a second carrier set corresponding to the to-be-activated carrier, acquire a first mapping relationship between a carrier identifier and the second carrier set in advance, and search for the carrier identifier corresponding to the second carrier set from the first mapping relationship. The second carrier set corresponding to the to-be-activated carrier refers to that a carrier in the second carrier set is completely the same as the to-be-activated carrier. For example, in a case where the to-be-activated carriers are carriers 1 and 2, the second carrier set can only include the carriers 1 and 2; and in a case where the to-be-activated carriers are carriers 2 and 3, the second carrier set can only include the carriers 2 and 3.

Figure 9:
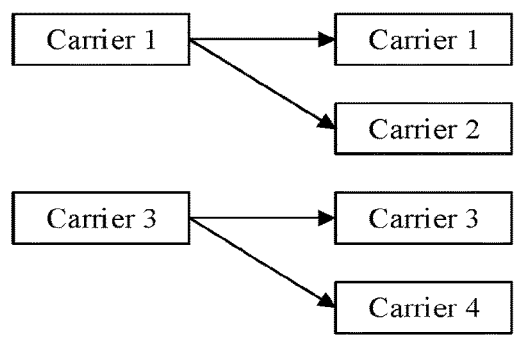
FIG. 9 is a schematic diagram showing a first mapping relationship according to another exemplary embodiment.

During implementation, the case where the second carrier set includes multiple carriers refers to that the second carrier set includes carrier identifiers of the multiple carriers. As each carrier identifier is configured to identify a carrier, the second carrier set includes multiple carriers. For example, the second carrier set indicated by the carrier identifier 1 in the first corresponding relationship includes carriers 1-2, and the second carrier set indicated by the carrier identifier 2 includes carriers 3-4, and supposing that the to-be-activated carrier is the carriers 1-2, the carrier identifier determined by the base station is the carrier identifier 1, which refers to FIG. 9.

It is to be noted that the first corresponding relationship may be sent by the base station to the UE, and may also be specified in the communication protocol, and there are no limits made thereto in the embodiment.

When the first corresponding relationship is sent by the base station to the UE, the base station may carry the first corresponding relationship by Radio Resource Control (RRC) signaling or Medium Access Control (MAC) Control Element (CE) or physical layer signaling to send to the UE.

In Operation 802, the base station sends wake-up information to UE on the predetermined carrier identified by the carrier identifier, the predetermined carrier being a carrier, configured to transmit the wake-up information, in at least two carriers allocated to the UE. For example, the carrier identifier determined by the base station is the carrier identifier 1. When the carrier identifier 1 is configured to identify the carrier 1, the base station determines that the predetermined carrier is the carrier 1, and sends the wake-up information to the UE on the carrier 1. The wake-up information may be a wake-up signal, or may be downlink control signaling. There are no limits made thereto.

It is to be noted that the wake-up information is to indicate that the UE reads a carrier identifier of the predetermined carrier. In a possible implementation, the carrier identifier may indicate that the UE activates the predetermined carrier, and may further indicate that the UE activates at least one other carrier; and in another implementation, the carrier identifier may indicate that the UE activates at least two other carriers.

In Operation 803, the UE receives the wake-up information on the predetermined carrier.

In Operation 804, the UE determines a second carrier set indicated by the carrier identifier of the predetermined carrier from the first mapping relationship.

In Operation 805, the UE activates each carrier in the second carrier set.

The UE may activate the predetermined carrier and at least one other carrier based on the wake-up information, or, may activate at least two other carriers based on the wake-up information, which may be replaced as: the UE activates each carrier in the second carrier set.

Operations 801-802 may be independently implemented as the embodiment at the base station side, and operations 803-805 may be independently implemented as the embodiment at the UE side.

To sum up, according to the carrier activation method provided by the present disclosure, wake-up information may be received on a predetermined carrier; and the predetermined carrier and at least one other carrier may be activated based on the wake-up information, or, at least two other carriers may be activated based on the wake-up information. As the UE may be indicated through one piece of wake-up information to activate at least two carriers, the problem that the UE needs to detect the wake-up information on each carrier and determine whether to activate the carrier based on the wake-up information is solved, and the energy consumption of the UE is reduced and the endurance of the UE is improved.

Figure 10:
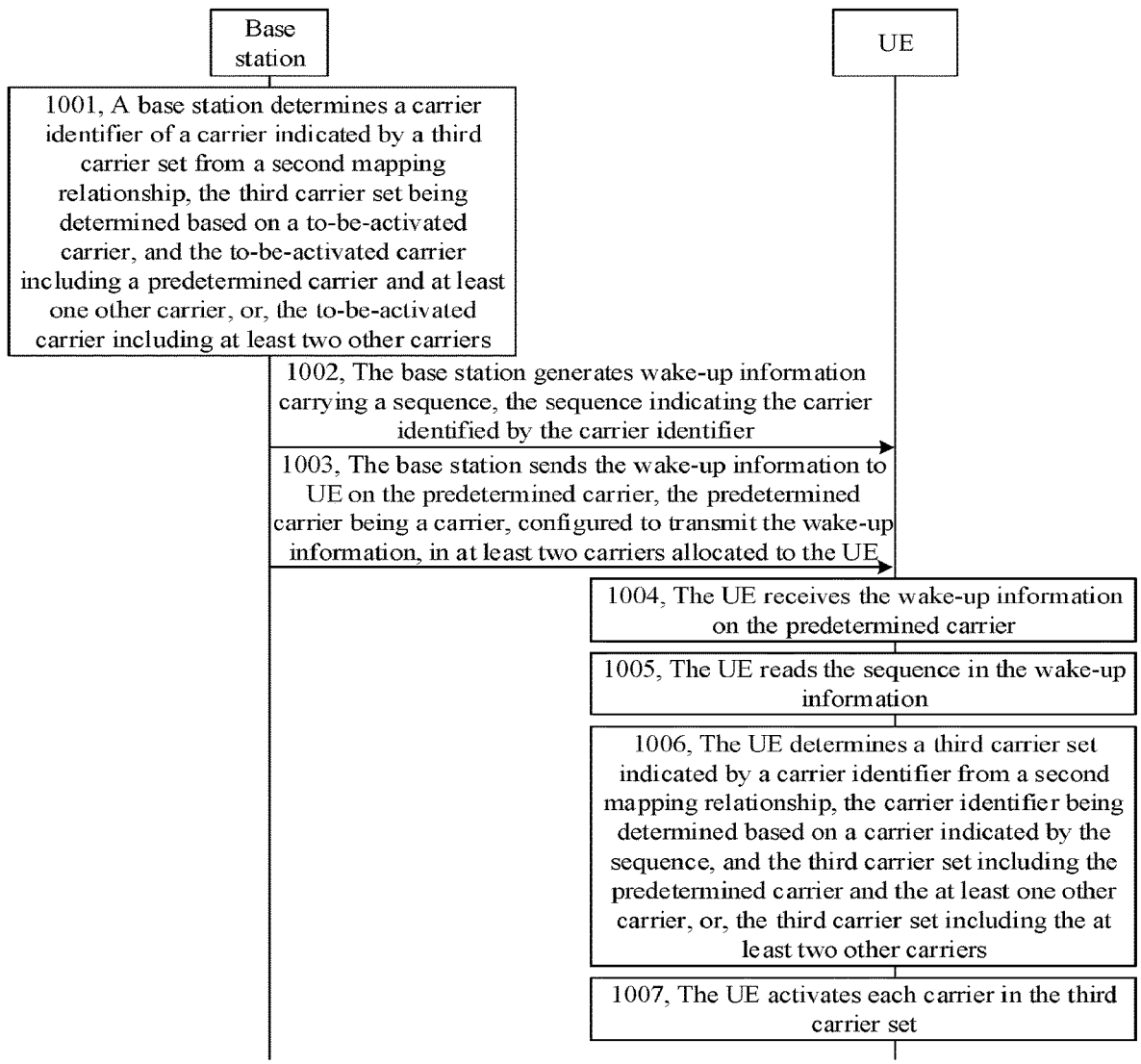
FIG. 10 is a flowchart showing a carrier activation method according to another exemplary embodiment.

FIG. 10 is a flowchart showing a carrier activation method according to another exemplary embodiment. The carrier activation method is applied to the implementation environment shown in FIG. 4. As shown in FIG. 10, the carrier activation method may include the following operations.

In Operation 1001, a base station determines a carrier identifier of a carrier indicated by a third carrier set from a second mapping relationship, the third carrier set being determined based on a to-be-activated carrier, and the to-be-activated carrier including a predetermined carrier and at least one other carrier, or, the to-be-activated carrier including at least two other carriers. For the implementation process of operation 1001, refer to the descriptions in operation 801.

In Operation 1002, the base station generates wake-up information carrying a sequence, the sequence indicating the carrier identified by the carrier identifier. After the carrier identifier is obtained, when the wake-up information is a wake-up signal, the base station may generate the wake-up information according to the process of operation 601; and when the wake-up information is a downlink control instruction, the base station may generate the wake-up information according to the process of operation 701.

In Operation 1003, the base station sends the wake-up information to UE on the predetermined carrier, the predetermined carrier being a carrier, configured to transmit the wake-up information, in at least two carriers allocated to the UE. The base station may determine the predetermined carrier that is pre-configured, and send the wake-up information to the UE on the predetermined carrier.

In Operation 1004, the UE receives the wake-up information on the predetermined carrier.

In Operation 1005, the UE reads the sequence in the wake-up information.

After the wake-up information is obtained, when the wake-up information is the wake-up signal, the base station may read the sequence according to the process of operation 604; and when the wake-up information is the downlink control instruction, the base station may read the sequence according to the process of operation 704.

In Operation 1006, the UE determines a third carrier set indicated by a carrier identifier from a second mapping relationship, the carrier identifier being determined based on a carrier indicated by the sequence, and the third carrier set including the predetermined carrier and the at least one other carrier, or, the third carrier set including the at least two other carriers. The case where the third carrier set includes multiple carriers refers to that the third carrier set includes carrier identifiers of the multiple carriers. As each carrier identifier is configured to identify one carrier, the third carrier set includes multiple carriers.

In Operation 1007, the UE activates each carrier in the third carrier set. The UE activates the predetermined carrier and at least one other carrier based on the wake-up information, or, the UE activates at least two other carriers based on the wake-up information, which may be replaced as the UE activates each carrier in the third carrier set.

Operations 1001-1003 may be independently implemented as the embodiment at the base station side, and operations 1004-1007 may be independently implemented as the embodiment at the UE side.

To sum up, according to the carrier activation method provided by the present disclosure, wake-up information may be received on a predetermined carrier; and the predetermined carrier and at least one other carrier may be activated based on the wake-up information, or, at least two other carriers may be activated based on the wake-up information. As the UE may be indicated through one piece of wake-up information to activate at least two carriers, the problem that the UE needs to detect the wake-up information on each carrier and determine whether to activate the carrier based on the wake-up information is solved, and the energy consumption of the UE is reduced and the endurance of the UE is improved.

Figure 11:
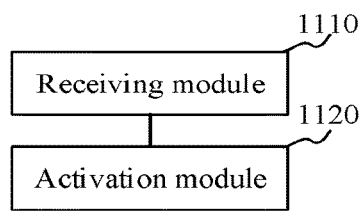
FIG. 11 is a block diagram showing a carrier activation apparatus according to an exemplary embodiment.

FIG. 11 is a block diagram showing a carrier activation apparatus according to an exemplary embodiment. The carrier activation apparatus is applied to the UE 401 shown in FIG. 4. As shown in FIG. 11, the carrier activation apparatus may include a receiving module 1110 and an activation module 1120. Of course, it should be understood that one or more of the modules described in this specification can be implemented by hardware, such as circuitry.

The receiving module 1110 is configured to receive wake-up information on a predetermined carrier, the predetermined carrier being a carrier, configured to transmit the wake-up information, in at least two carriers allocated to UE.

The activation module 1120 is configured to activate the predetermined carrier and at least one other carrier based on the wake-up information received by the receiving module 1110, or, activate at least two other carriers based on the wake-up information received by the receiving module 1110, the other carrier(s) being a carrier(s) other than the predetermined carrier in the at least two carriers.

In an embodiment of the present disclosure, when the wake-up information includes a wake-up signal, the activation module 1120 is further configured to: read a sequence in the wake-up signal; and activate the predetermined carrier and the at least one other carrier based on the sequence, or, activate the at least two other carriers based on the sequence.

In an embodiment of the present disclosure, the sequence may include at least two indication bits, each indication bit is configured to indicate a carrier, a carrier indicated by each indication bit having a predetermined value is a to-be-activated carrier, and the to-be-activated carrier may include the predetermined carrier and the at least one other carrier, or, the to-be-activated carrier may include the at least two other carriers.

In an embodiment of the present disclosure, the sequence is configured to indicate a first carrier set, each carrier in the first carrier set may be a to-be-activated carrier, and the to-be-activated carrier may include the predetermined carrier and the at least one other carrier, or, the to-be-activated carrier may include the at least two other carriers.

In an embodiment of the present disclosure, each sequence is configured to indicate a to-be-activated carrier, and the to-be-activated carrier may include the predetermined carrier and the at least one other carrier, or the to-be-activated carrier may include the at least two other carriers.

In an embodiment of the present disclosure, when the wake-up information includes downlink control signaling, the activation module 1120 is further configured to: read indication information in the downlink control signaling, and activate the predetermined carrier and the at least one other carrier based on the indication information, or, activate the at least two other carriers based on the indication information.

In an embodiment of the present disclosure, the activation module 1120 is further configured to read, in response to the indication information having a fixed position in the downlink control signaling, the indication information at the fixed position in the downlink control signaling, or acquire position information of the indication information in response to the indication information having a flexible position in the downlink control signaling, the position information indicating a position of the indication information at present time in the downlink control signaling, and read the indication information at the position indicated by the position information in the downlink control signaling.

In an embodiment of the present disclosure, the activation module 1120 is further configured to determine a second carrier set indicated by a carrier identifier of the predetermined carrier from a first mapping relationship, the second carrier set including the predetermined carrier and the at least one other carrier, or, the second carrier set including the at least two other carriers; and activate each carrier in the second carrier set.

In an embodiment of the present disclosure, the activation module 1120 is further configured to read a sequence in the wake-up information, determine a third carrier set indicated by a carrier identifier from a second mapping relationship, the carrier identifier being determined based on a carrier indicated by the sequence, and the third carrier set including the predetermined carrier and the at least one other carrier, or the third carrier set including the at least two other carriers; and activate each carrier in the third carrier set.

To sum up, according to the carrier activation apparatus provided by the present disclosure, wake-up information may be received on a predetermined carrier, and the predetermined carrier and at least one other carrier may be activated based on the wake-up information, or at least two other carriers may be activated based on the wake-up information. As the UE may be indicated through one piece of wake-up information to activate at least two carriers, the problem that the UE needs to detect the wake-up information on each carrier and determine whether to activate the carrier based on the wake-up information is solved, and the energy consumption of the UE is reduced and the endurance of the UE is improved.

Figure 12:
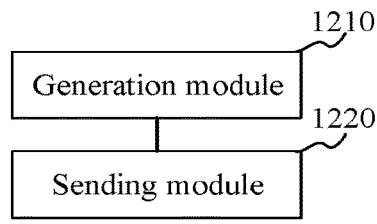
FIG. 12 is a block diagram showing a carrier activation apparatus according to an exemplary embodiment.

FIG. 12 is a block diagram showing a carrier activation apparatus according to an exemplary embodiment. The carrier activation apparatus is applied to the base station 402 shown in FIG. 4. As shown in FIG. 12, the carrier activation apparatus may include: a generation module 1210 and a sending module 1220.

The generation module 1210 is configured to generate wake-up information.

The sending module 1220 is configured to send the wake-up information generated by the generation module 1210 to UE on a predetermined carrier, the predetermined carrier being a carrier, configured to transmit the wake-up information, in at least two carriers allocated to the UE, the wake-up information indicating that the UE activates the predetermined carrier and at least one other carrier, or, the wake-up information indicating that the UE activates at least two other carriers, and the other carrier(s) being a carrier(s) other than the predetermined carrier in the at least two carriers.

In an embodiment of the present disclosure, when the wake-up information includes a wake-up signal, the generation module 1210 is further configured to: generate a wake-up signal carrying a sequence, the sequence indicating that the UE activates the predetermined carrier and the at least one other carrier, or, the sequence indicating that the UE activates the at least two other carriers.

In an embodiment of the present disclosure, the sequence may include at least two indication bits, each indication bit is configured to indicate a carrier, a carrier indicated by each indication bit having a predetermined value may be a to-be-activated carrier, and the to-be-activated carrier may include the predetermined carrier and the at least one other carrier, or, the to-be-activated carrier may include the at least two other carriers.

In an embodiment of the present disclosure, the sequence is configured to indicate a first carrier set, each carrier in the first carrier set may be a to-be-activated carrier, and the to-be-activated carrier may include the predetermined carrier and the at least one other carrier, or, the to-be-activated carrier may include the at least two other carriers.

In an embodiment of the present disclosure, each sequence is configured to indicate a to-be-activated carrier, and the to-be-activated carrier may include the predetermined carrier and the at least one other carrier, or, the to-be-activated carrier may include the at least two other carriers.

In an embodiment of the present disclosure, when the wake-up information includes downlink control signaling, the generation module 1210 is further configured to: generate downlink control signaling carrying indication information, the indication information indicating that the UE activates the predetermined carrier and the at least one other carrier, or, the sequence indicating that the UE activates the at least two other carriers.

In an embodiment of the present disclosure, the generation module 1210 is further configured to add, in response to the indication information having a fixed position in the downlink control signaling, the indication information to the fixed position in the downlink control signaling, or generate position information of the indication information in response to the indication information having a flexible position in the downlink control signaling, the position information indicating a position of the indication information at present time in the downlink control signaling, and add the indication information to the position indicated by the position information in the downlink control signaling.

In an embodiment of the present disclosure, the generation module 1210 is further configured to determine a carrier identifier of a predetermined carrier indicated by a second carrier set from a first mapping relationship, the second carrier set being determined based on a to-be-activated carrier, and the to-be-activated carrier including the predetermined carrier and the at least one other carrier, or the to-be-activated carrier including the at least two other carriers, and send the wake-up information to the UE on the predetermined carrier identified by the carrier identifier.

In an embodiment of the present disclosure, the generation module 1210 is further configured to determine a carrier identifier of a carrier indicated by a third carrier set from a second mapping relationship, the third carrier set being determined based on a to-be-activated carrier, and the to-be-activated carrier including the predetermined carrier and the at least one other carrier, or the to-be-activated carrier including the at least two other carriers; and generate wake-up information carrying a sequence, the sequence indicating the carrier identified by the carrier identifier.

To sum up, according to the carrier activation apparatus provided by the present disclosure, wake-up information may be sent to UE on a predetermined carrier; and the UE may activate the predetermined carrier and at least one other carrier based on the wake-up information, or, the UE may activate at least two other carriers based on the wake-up information. As the UE may be indicated through one piece of wake-up information to activate at least two carriers, the problem that the UE needs to detect the wake-up information on each carrier and determine whether to activate the carrier based on the wake-up information is solved, and the energy consumption of the UE is reduced and the endurance of the UE is improved.

For the apparatus in the above embodiments, the specific manner for the operation executed by each module has been described in detail in the embodiments related to the method, and is not elaborated herein.

An exemplary embodiment of the present disclosure provides UE, which can implement the carrier activation method provided by the present disclosure. The UE may include a processor, and a memory configured to store an instruction executable for the processor. The processor is configured to receive wake-up information on a predetermined carrier, the predetermined carrier being a carrier, configured to transmit the wake-up information, in at least two carriers allocated to the UE, and activate the predetermined carrier and at least one other carrier based on the wake-up information, or, activate at least two other carriers based on the wake-up information, the other carrier(s) being a carrier(s) other than the predetermined carrier in the at least two carriers.

An exemplary embodiment of the present disclosure provides a base station, which can implement the carrier activation method provided by the present disclosure. The base station may include a processor and a memory configured to store an instruction executable for the processor. The processor is configured to generate wake-up information, and send the wake-up information on a predetermined carrier, the predetermined carrier being a carrier, configured to transmit the wake-up information, in at least two carriers allocated to the UE, the wake-up information indicating that the UE activates the predetermined carrier and at least one other carrier, or, the wake-up information indicating that the UE activates at least two other carriers, and the other carrier(s) being a carrier(s) other than the predetermined carrier in the at least two carriers.

Figure 13:
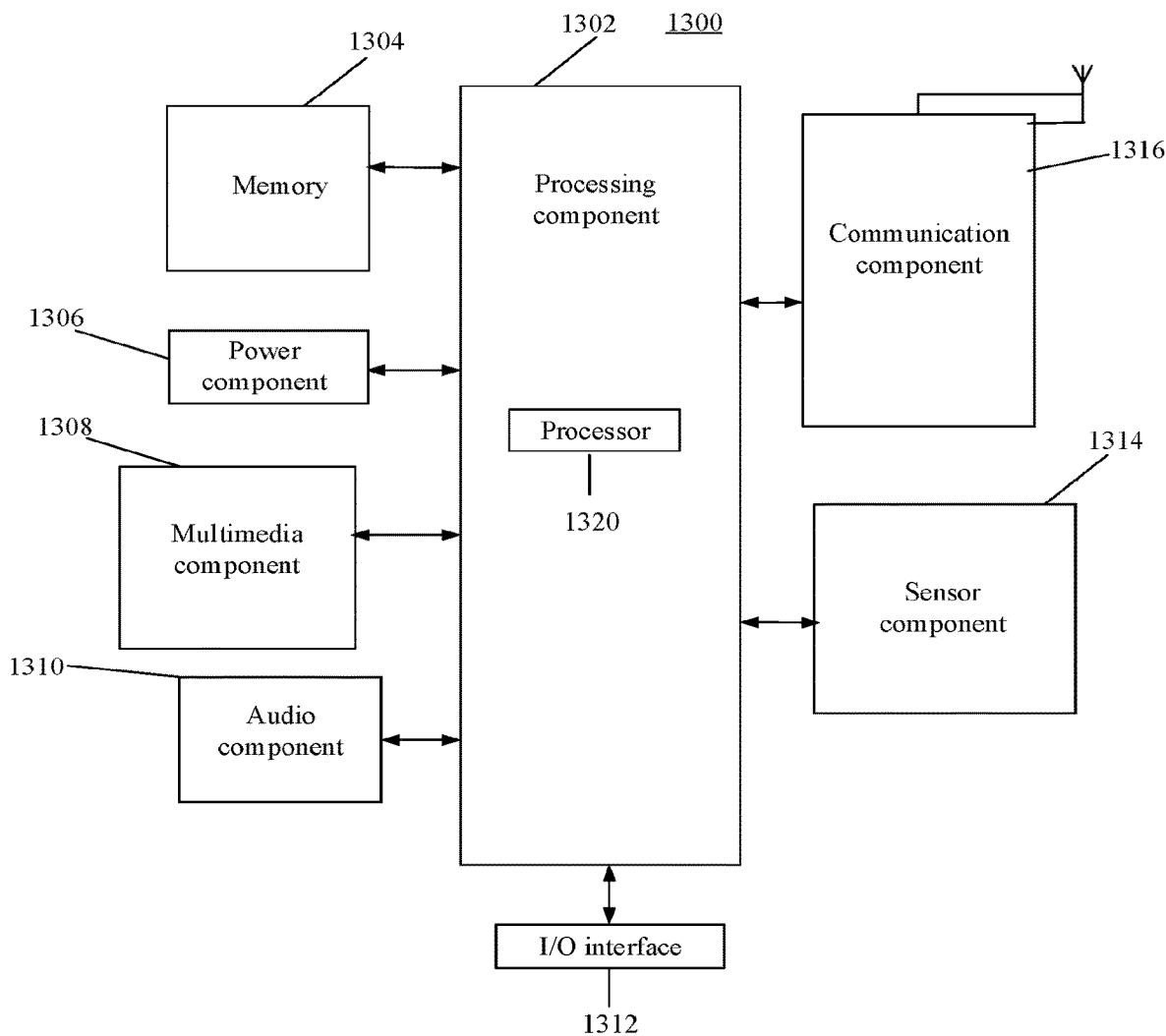
FIG. 13 is a block diagram showing a data transmission apparatus according to an exemplary embodiment.

FIG. 13 is a block diagram showing a data transmission apparatus 1300 according to an exemplary embodiment. For example, the apparatus 1300 may be a mobile phone, a computer, a digital broadcast terminal, a messaging device, a gaming console, a tablet, a medical device, exercise equipment, a PDA, and the like.

Referring to FIG. 13, the apparatus 1300 may include one or more of the following components a processing component 1302, a memory 1304, a power component 1306, a multimedia component 1308, an audio component 1310, an Input/Output (I/O) interface 1312, a sensor component 1314, and a communication component 1316.

The processing component 1302 typically controls overall operations of the apparatus 1300, such as the operations associated with display, telephone calls, data communications, camera operations, and recording operations. The processing component 1302 may include one or more processors 1320 to execute instructions to perform all or part of the operations in the above described methods. Moreover, the processing component 1302 may include one or more modules which facilitate the interaction between the processing component 1302 and other components. For instance, the processing component 1302 may include a multimedia module to facilitate the interaction between the multimedia component 1308 and the processing component 1302.

The memory 1304 is configured to store various types of data to support the operation of the apparatus 1300. Examples of such data include instructions for any applications or methods operated on the apparatus 1300, contact data, phonebook data, messages, pictures, video, and the like. The memory 1304 may be implemented by using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 1306 provides power to various components of the apparatus 1300. The power component 1306 may include a power management system, one or more power sources, and any other components associated with the generation, management, and distribution of power in the apparatus 1300.

The multimedia component 1308 includes a screen providing an output interface between the apparatus 1300 and the user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also sense a period of time and a pressure associated with the touch or swipe action. In some embodiments, the multimedia component 1308 includes a front camera and/or a rear camera. The front camera and/or the rear camera may receive external multimedia data when the apparatus 1300 is in an operation mode, such as a photographing mode or a video mode. Each of the front camera and the rear camera may be a fixed optical lens system or have focus and optical zoom capability.

The audio component 1310 is configured to output and/or input audio signals. For example, the audio component 1310 includes a Microphone (MIC) configured to receive an external audio signal when the apparatus 1300 is in an operation mode, such as a call mode, a recording mode, and a voice recognition mode. The received audio signal may further be stored in the memory 1304 or transmitted via the communication component 1316. In some embodiments, the audio component 1310 further includes a speaker configured to output audio signals.

The I/O interface 1312 provides an interface between the processing component 1302 and peripheral interface modules. The peripheral interface modules may be a keyboard, a click wheel, buttons, and the like. The buttons may include, but are not limited to, a home button, a volume button, a starting button, and a locking button.

The sensor component 1314 includes one or more sensors to provide status assessments of various aspects of the apparatus 1300. For instance, the sensor component 1314 may detect an on/off status of the apparatus 1300 and relative positioning of components, such as a display and small keyboard of the apparatus 1300, and the sensor component 1314 may further detect a change in a position of the apparatus 1300 or a component of the apparatus 1300, presence or absence of contact between the user and the apparatus 1300, orientation or acceleration/deceleration of the apparatus 1300 and a change in temperature of the apparatus 1300. The sensor component 1314 may include a proximity sensor, configured to detect the presence of nearby objects without any physical contact. The sensor component 1314 may also include a light sensor, such as a Complementary Metal Oxide Semiconductor (CMOS) or Charge Coupled Device (CCD) image sensor, configured for use in an imaging application. In some embodiments, the sensor component 1314 may also include an accelerometer sensor, a gyroscope sensor, a magnetic sensor, a pressure sensor, or a temperature sensor.

The communication component 1316 is configured to facilitate communication, wired or wirelessly, between the apparatus 1300 and other devices. The apparatus 1300 may access any communication-standard-based wireless network, such as a Wi-Fi network, a 2nd-Generation (2G) or 3rd-Generation (3G) network or a combination thereof. In an exemplary embodiment, the communication component 1316 receives a broadcast signal or broadcast associated information from an external broadcast management system via a broadcast channel. In an exemplary embodiment, the communication component 1316 further includes a near field communication (NFC) module to facilitate short-range communications.

In exemplary embodiments, the apparatus 1300 may be implemented with one or more Application Specific Integrated Circuits (ASIC), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic components, for performing the above described methods.

In an exemplary embodiment, a non-temporary computer readable storage medium including an instruction is further provided, for example, the memory 1304 including the instruction; and the instruction may be executed by the processing component 1320 of the apparatus 1300 to complete the above method. For example, the non-transitory computer-readable storage medium may be a Read Only Memory (ROM), a Random Access Memory (RAM), a Compact Disc Read-Only Memory (CD-ROM), a magnetic tape, a floppy disc, an optical data storage device, and the like.

A non-transitory computer-readable storage medium is provided where an instruction in the storage medium causes, when executed by a processor of a mobile terminal, the mobile terminal to perform the carrier activation method.

Figure 14:
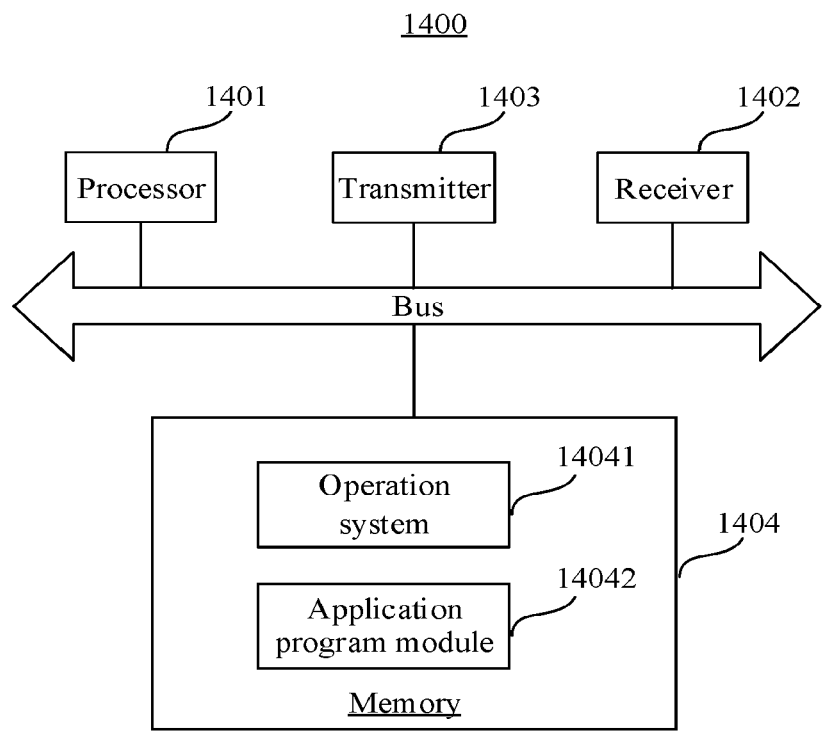
FIG. 14 is a block diagram showing a carrier activation apparatus according to an exemplary embodiment.

FIG. 14 is a block diagram showing a carrier activation apparatus 1400 according to an exemplary embodiment. For example, the carrier activation apparatus 1400 may be a base station. As shown in FIG. 14, the data transmission apparatus 1400 may include: a processor 1401, a receiver 1402, a transmitter 1403 and a memory 1404. The receiver 1402, the transmitter 1403 and the memory 1404 are connected with the processor 1401 through a bus respectively.

The processor 1401 includes one or more than one processing core, and the processor 1401 runs a software program and a module to execute the method executed by the base station in the carrier activation methods provided in the embodiments of the present disclosure. The memory 1404 may be configured to store the software program and the module. Specifically, the memory 1404 may store an operating system 14041 and an application program module 14042 required by at least one function. The receiver 1402 is configured to receive communication data sent by another device, and the transmitter 1403 is configured to send communication data to the other device.

Figure 15:
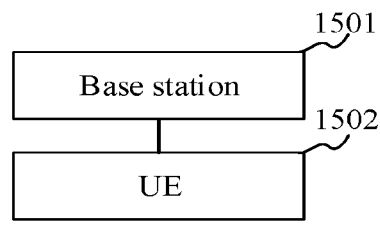
FIG. 15 is a block diagram showing a data transmission system according to an exemplary embodiment.

FIG. 15 is a block diagram showing a data transmission system according to an exemplary embodiment. As shown in FIG. 15, the data transmission system includes a base station 1501 and UE 1502.

The base station 1501 is configured to execute the carrier activation methods executed by the base station in the embodiments shown in FIG. 5 to FIG. 10. The UE 1502 is configured to execute the carrier activation methods executed by the UE in the embodiments shown in FIG. 5 to FIG. 10.

An exemplary embodiment of the present disclosure provides a computer-readable storage medium. At least one instruction, at least one segment of program, a code set or an instruction set is stored in the storage medium, and the at least one instruction, the at least one segment of program, the code set or the instruction set is loaded and executed by a processor to implement the abovementioned carrier activation method.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for carrier activation, comprising:
receiving wake-up information on a predetermined carrier that is configured to transmit the wake-up information, in at least two carriers allocated to User Equipment (UE); wherein the wake-up information includes downlink control signaling; and
activating the predetermined carrier and at least one other carrier based on the wake-up activating comprising:
acquiring position information of indication information when the indication information includes a flexible position in the downlink control signaling, the position information indicating a position of the indication information at present time in the downlink control signaling, and reading the indication information at the position indicated by the position information in the downlink control signaling; and
activating the predetermined carrier and the at least one other carrier based on the indication information;
the at least one other carrier being carriers other than the predetermined carrier in the at least two carriers.

2. The method of claim 1, wherein the wake-up information further includes a wake-up signal, and activating the predetermined carrier and the at least one other carrier based on the wake-up information further comprises:
reading a sequence in the wake-up signal; and
activating the predetermined carrier and the at least one other carrier based on the sequence.

3. The method of claim 2, wherein the sequence comprises at least two indication bits that are configured to indicate a carrier having a predetermined value is a to-be-activated carrier, where the to-be-activated carrier includes the predetermined carrier and the at least one other carrier.

4. The method of claim 2, wherein the sequence is configured to indicate a first carrier set with each carrier in the first carrier set being a to-be-activated carrier including the predetermined carrier and the at least one other carrier.

5. The method of claim 2, wherein each sequence is configured to indicate a to-be-activated carrier that includes the predetermined carrier and the at least one other carrier.

6. The method of claim 1, wherein activating the predetermined carrier and the at least one other carrier based on the wake-up information, comprises:
  determining a second carrier set indicated by a carrier identifier of the predetermined carrier from a first mapping relationship, where the second carrier set includes the predetermined carrier and the at least one other carrier; and
  activating each carrier in the second carrier set.

7. The method of claim 1, wherein activating the predetermined carrier and the at least one other carrier based on the wake-up information further comprises:
  reading a sequence in the wake-up information;
  determining a third carrier set indicated by a carrier identifier from a second mapping relationship, the carrier identifier being determined based on a carrier indicated by the sequence, where the third carrier set includes the predetermined carrier and the at least one other carrier; and
  activating each carrier in the third carrier set.

8. A method for carrier activation, comprising:
  generating wake-up information comprising downlink control signaling, comprising:
    generating position information of indication information when the indication information has a flexible position in the downlink control signaling, the position information indicating a position of the indication information at present time in the downlink control signaling, and adding the indication information to the position indicated by the position information in the downlink control signaling; and
  sending the wake-up information to User Equipment (UE) on a predetermined carrier that is configured to transmit the wake-up information in at least two carriers allocated to the UE, the wake-up information indicating that the UE activates the predetermined carrier and at least one other carrier, and the at least one other carrier being carriers other than the predetermined carrier in the at least two carriers.

9. The method of claim 8, wherein the wake-up information further includes a wake-up signal, and generating the wake-up information further comprises:
  generating a wake-up signal carrying a sequence that indicates that the UE activates the predetermined carrier and the at least one other carrier.

10. The method of claim 9, wherein the sequence further comprises at least two indication bits with each indication bit being configured to indicate a carrier having a predetermined value that is a to-be-activated carrier including the predetermined carrier and the at least one other carrier.

11. The method of claim 9, wherein the sequence is configured to indicate a first carrier set with each carrier in the first carrier set being a to-be-activated carrier that includes the predetermined carrier and the at least one other carrier.

12. The method of claim 9, wherein each sequence is configured to indicate a to-be-activated carrier including the predetermined carrier and the at least one other carrier.

13. The method of claim 8, wherein sending the wake-up information to the OF on the predetermined carrier further comprises:
  determining, from a first mapping relationship, a carrier identifier of a predetermined carrier indicated by a second carrier set that is determined based on a to-be-activated carrier that includes the predetermined carrier and the at least one other carrier; and
  sending the wake-up information to the UE on the predetermined carrier identified by the carrier identifier.

14. The method of claim 8, wherein generating the wake-up information further comprises:
  determining, from a second mapping relationship, a carrier identifier of a carrier indicated by a third carrier set that is determined based on a to-be-activated carrier that includes the predetermined carrier and the at least one other carrier; and
  generating wake-up information carrying a sequence that indicates the carrier identified by the carrier identifier.

15. A base station, comprising:
  a processor; and
  a memory that is configured to store an instruction executable by the processor,
  wherein the processor is configured to implement operations of the method of claim 10.

16. User Equipment (UE), comprising:
  a processor; and
  a memory that is configured to store an instruction executable by the processor,
  wherein the processor is configured to:
  receive wake-up information on a predetermined carrier that is configured to transmit the wake-up information in at least two carriers allocated to the UE: wherein the wake-up information includes downlink control signaling; and
  activate the predetermined carrier and at least one other carrier based on the wake-up information, comprising:
    acquiring position information of indication information when the indication information includes a flexible position in the downlink control signaling, the position information indicating a position of the indication information at present time in the downlink control signaling, and reading the indication information at the position indicated by the position information in the downlink control signaling; and
    activating the predetermined carrier and the at least one other carrier based on the indication information,
  the at least one other carrier being carriers other than the predetermined carrier in the at least two carriers.

* * * * *